United States Patent [19]
Horschel

[11] Patent Number: 5,761,844
[45] Date of Patent: Jun. 9, 1998

[54] FISHING ROD HOLDER

[75] Inventor: Louis A. Horschel, Springville, N.Y.

[73] Assignee: Horschel Brothers Precision LLC, Springville, N.Y.

[21] Appl. No.: 743,635

[22] Filed: Nov. 4, 1996

[51] Int. Cl.$^6$ .................................................. A01K 97/10
[52] U.S. Cl. .................. 43/21.2; 248/292.12; 248/278.1; 248/131
[58] Field of Search ................... 43/21.2; 248/292.12, 248/278.1, 131

[56] References Cited

U.S. PATENT DOCUMENTS

| | | | |
|---|---|---|---|
| 567,084 | 9/1896 | Eicher | 43/21.2 |
| 1,856,477 | 5/1932 | Gerline | |
| 2,314,747 | 3/1943 | White | |
| 2,540,584 | 2/1951 | Jaycox | 248/42 |
| 2,622,831 | 12/1952 | Fullwood | 248/292.12 |
| 3,139,252 | 6/1964 | Mann | 43/21.2 |
| 3,290,816 | 12/1966 | Eklof | 43/31.2 |
| 3,750,918 | 8/1973 | Jensen | 43/21.2 |
| 3,906,653 | 9/1975 | Williams | 43/21.2 |
| 4,827,654 | 5/1989 | Roberts | 43/21.2 |
| 5,054,737 | 10/1991 | DeLancey | 43/21.2 |
| 5,109,411 | 4/1992 | O'Connell | 248/278.1 |
| 5,299,773 | 4/1994 | Bertrand | 248/292.12 |
| 5,367,815 | 11/1994 | Liou | 43/21.2 |
| 5,438,789 | 8/1995 | Emory | 43/21.2 |
| 5,501,028 | 3/1996 | Hull et al. | 43/21.2 |

*Primary Examiner*—Michael J. Carone
*Assistant Examiner*—Darren Ark
*Attorney, Agent, or Firm*—Joseph P. Gastel

[57] ABSTRACT

A fishing rod holder having a base, a fishing rod holding tube pivotally mounted on the base, a one-way movable connection located between the base and the fishing rod holding tube for holding the fishing rod holding tube against movement to a more horizontal position while permitting the fishing rod holding tube to be swung to a more upright position by merely manually grasping the holding tube and pivoting it on its base, a disengagement member for disengaging the one-way movable connection to permit the fishing rod holding tube to be swung manually to a more horizontal position, with the one-way movable connection consisting of engaged serrated discs having relatively small serrations to permit the holding tube to be oriented at a plurality of relatively small angular positions between its horizontal and vertical limits of movement.

10 Claims, 3 Drawing Sheets

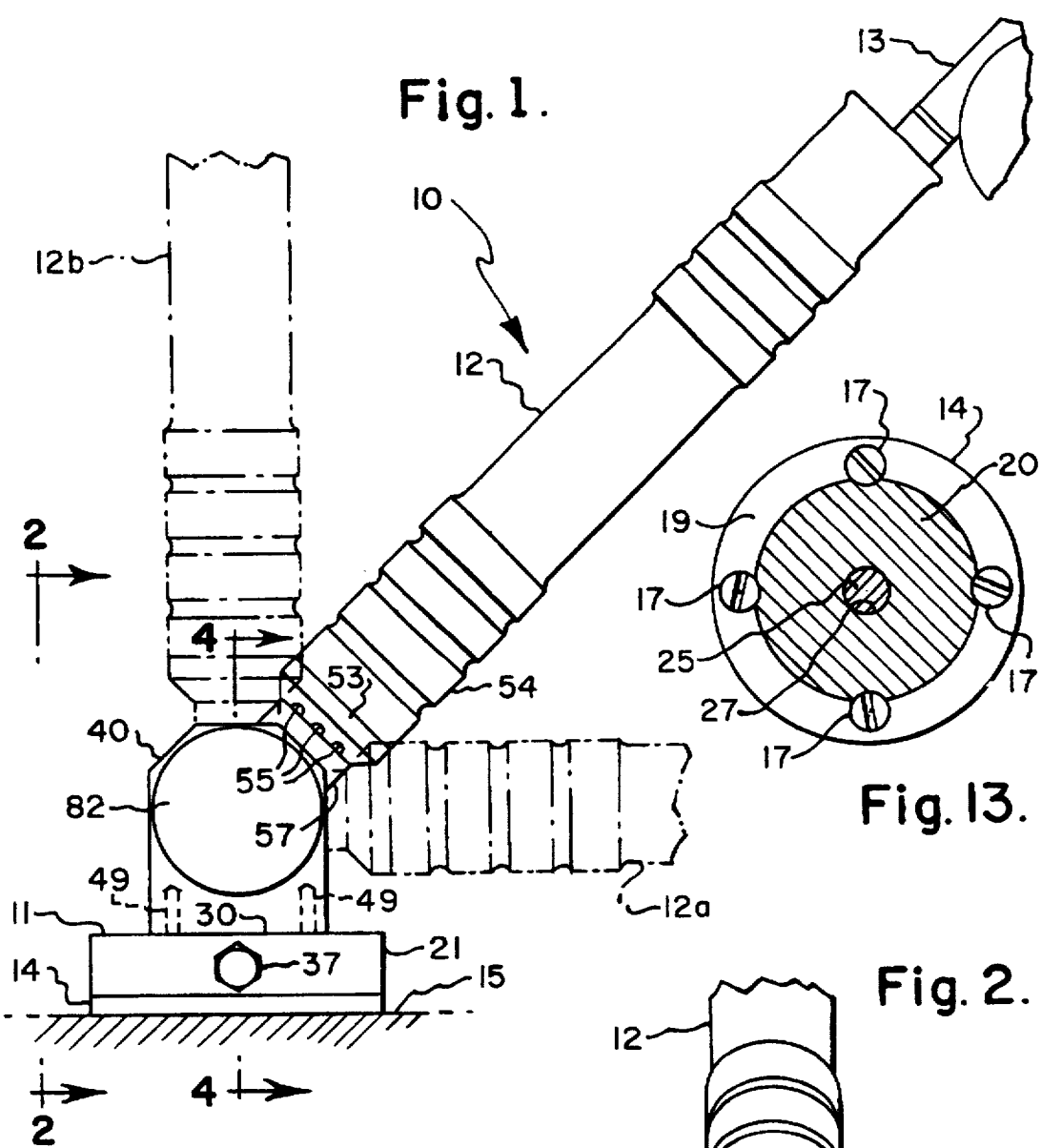
Fig. 1.
Fig. 13.
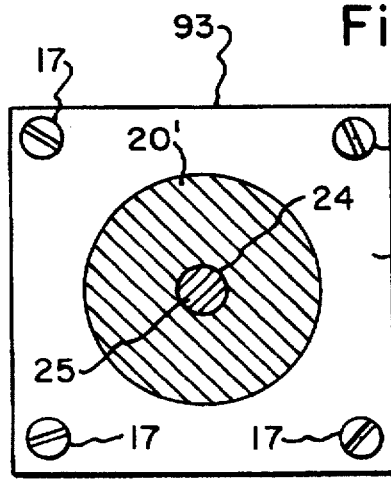
Fig. 14.
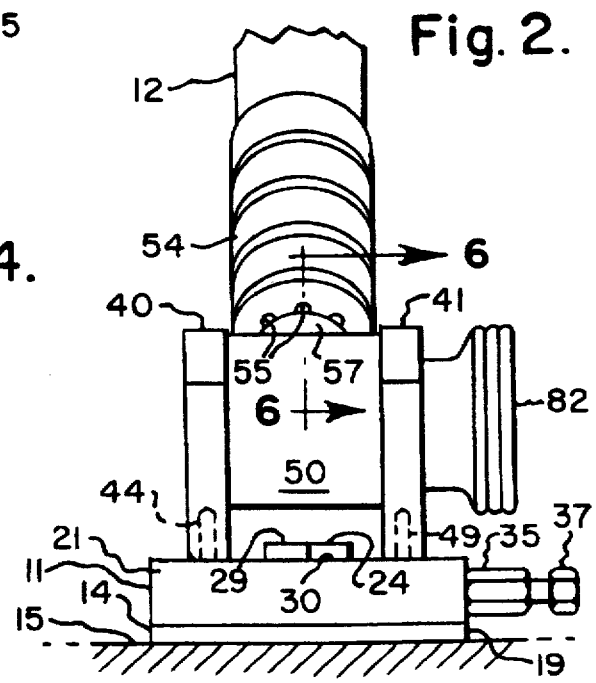
Fig. 2.

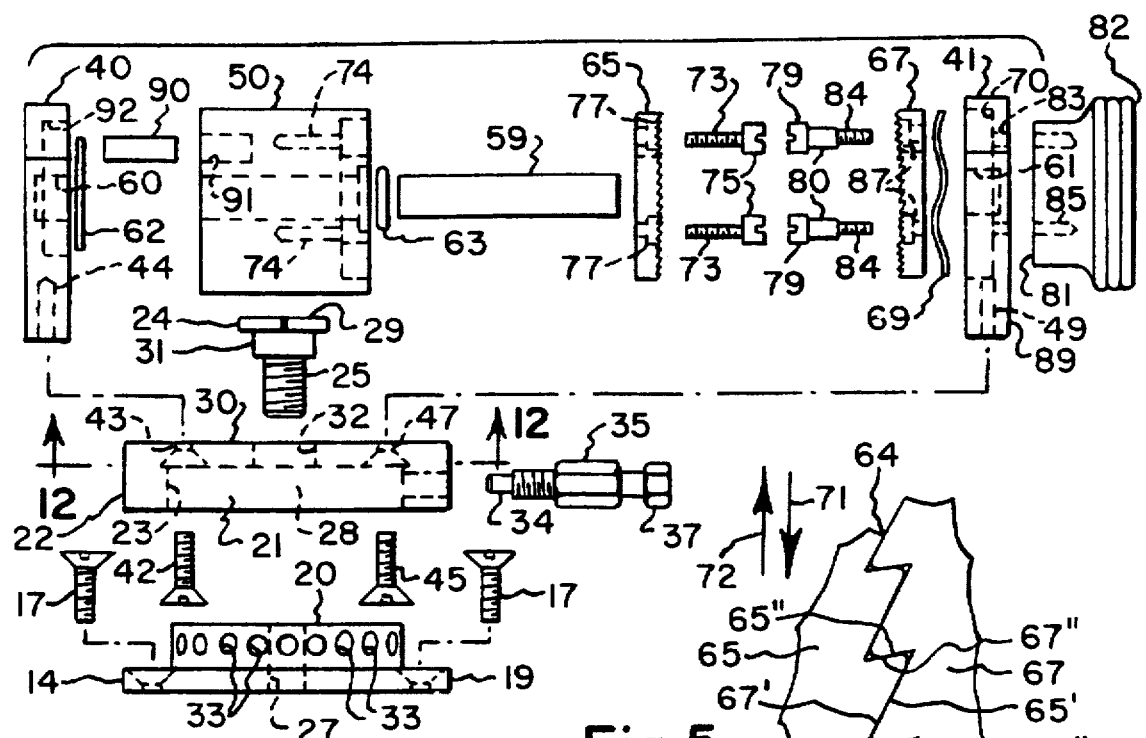
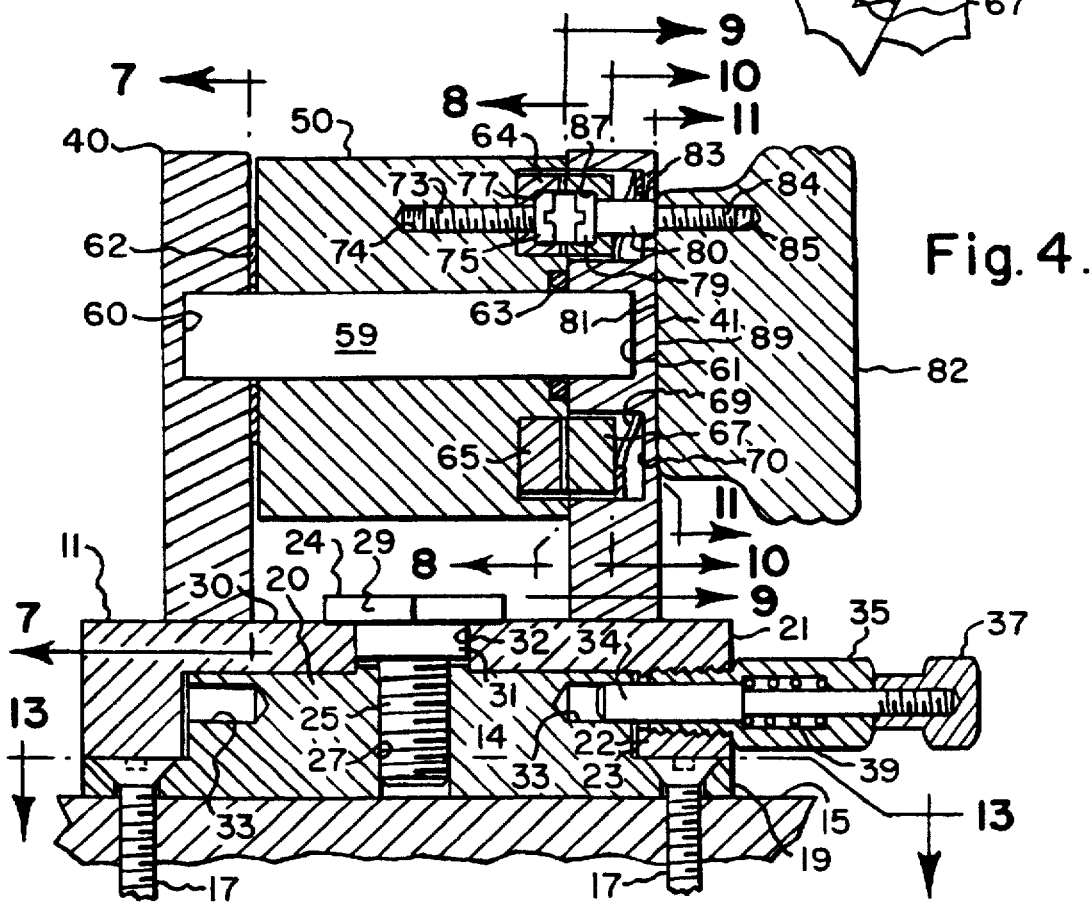
Fig. 3.
Fig. 5.
Fig. 4.

FISHING ROD HOLDER

BACKGROUND OF THE INVENTION

The present invention relates to an improved fishing rod holder of the type which is generally mounted on a boat.

By way of background, there are numerous types of fishing rod holders in existence. However, insofar as known, there is no fishing rod holder which is relatively simple in construction and includes a one-way movable connection which holds a fishing rod holding tube in a desired inclined attitude against movement to a more horizontal position while permitting it to be swung manually to a more vertical position to set a hook immediately after there has been a strike by a fish, and which can be released to permit the holding tube to be manually moved to a more horizontal position, and which permits the fishing rod holder to be selectively positioned at selective small increments between horizontal and vertical positions.

SUMMARY OF THE INVENTION

It is accordingly one object of the present invention to provide an improved fishing rod holder which includes a rod holding tube which is mounted with a one-way movable connection which holds the rod holding tube against movement to a more horizontal position while permitting the rod holding tube and the fishing rod held thereby to be manually swung to a more vertical position to thereby set a hook immediately after there has been a strike by a fish.

Another object of the present invention is to provide an improved fishing rod holder which has the advantage of the preceding object and which includes structure for selectively disengaging the one-way movable connection to permit the rod holding tube to be moved to a more horizontal position.

A further object of the present invention is to provide a fishing rod holder having a fishing rod holding tube which can be selectively set at small angular increments between horizontal and vertical positions.

Yet another object of the present invention is to provide a fishing rod holding tube which has a one-way movable connection which can be selectively swung to a perfectly vertical position to permit a fishing rod held thereby to be removed therefrom by merely moving it upwardly in a vertical direction. Other objects and attendant advantages of the present invention will readily be perceived hereafter.

The present invention relates to a fishing rod holder comprising a base, a fishing rod holding tube, a one-way movable connection between said base and said fishing rod holding tube for holding said fishing rod holding tube against movement to a more horizontal position while permitting said fishing rod holding tube to be manually moved to a more vertical position, and a disengagement member connected to said one-way movable connection for disengaging said one-way movable connection to permit said fishing rod holding tube to be manually moved to a more horizontal position.

The various aspects of the present invention will be more fully understood when the following portions of the specification are read in conjunction with the accompanying drawings wherein:

BRIEF DESCRIPTION OF THE DRAWINGS

FIG. 1 is a fragmentary side elevational view of the improved fishing rod holder with its pivotable holding tube shown in solid lines at a 45° angle and with the holding tube fragmentarily shown in dotted lines at its horizontal and vertical limits of pivotal movement;

FIG. 2 is a fragmentary view taken substantially in the direction of arrows 2—2 of FIG. 1;

FIG. 3 is an exploded view of the various parts of the fishing rod holder exclusive of the holding tube;

FIG. 4 is an enlarged cross sectional view taken substantially along line 4—4 of FIG. 1;

FIG. 5 is a fragmentary enlarged view showing the relationship between the left and right side ratcheting discs;

FIG. 13 is a cross sectional view taken substantially along line 13—13 of FIG. 4; and FIG. 14 is a cross sectional view taken substantially along line 13—13 of FIG. 4 but showing a different type of base having exposed mounting screws.

DESCRIPTION OF THE PREFERRED EMBODIMENTS

Figure 6:
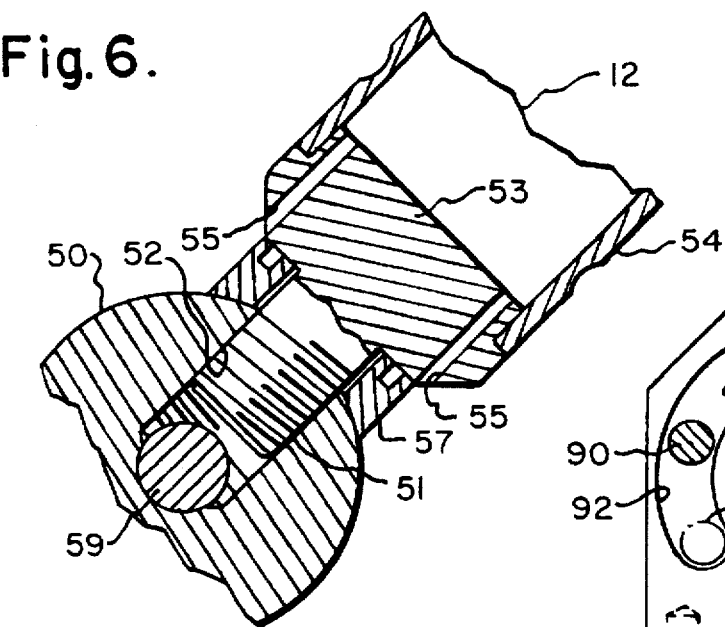
FIG. 6 is a fragmentary enlarged cross sectional view taken substantially along line 6—6 of FIG. 2 and showing the connection between the holding tube and the pivotable member.

The improved fishing rod holder 10 includes a base 11 on which a fishing rod holding tube 12 is pivotally mounted for movement between its extreme horizontal position 12a and its extreme vertical position 12b as desired by a fisherman. The handle of fishing rod 13 is received in fishing rod holding tube 12. As will become more apparent hereafter, in use the fishing rod holding tube is initially pivotable on base 11 to any desired position for holding a fishing rod. A one-way movable connection is located between fishing rod holding tube 12 and base 11 which permits the holding tube 12 to be manually moved toward vertical position 12b by merely grasping holding tube 12 and pivoting it counterclockwise on base 11, as would be desired to set a hook when there is a strike, and it can be pivotally moved on base 11 toward horizontal position 12a when the one-way movable connection is deactuated, as would be desired to initially place the holding tube in a fishing attitude between positions 12a and 12b.

The base 11 includes a plate 14 which is secured to a surface 15, such as a wall of a boat, by a plurality of screws or bolts 17. Bottom plate 14 includes an outer circumferential flange 19 (FIGS. 3, 4 and 13) and a central cylindrical boss 20. The upper plate 21 of base 11 includes an annular circumferential shoulder portion 22 which defines a cylindrical cavity 23 which receives cylindrical boss 20 of lower base plate 14. A shoulder bolt 24 includes a shank 25 which is threadably received in bore 27 of lower base plate 14. The head 29 of shoulder bolt 24 bears on the upper surface 30 of base upper plate 21. Cylindrical shoulder 31 is received in cylindrical bore 32 of base upper plate 21 to thus permit upper plate 21 to be pivotable on lower base plate 14.

The lower base plate 14 has a plurality of circumferentially spaced bores 33 which can selectively receive the tip of plunger 34 of spring biased detent 35. In this respect, a knob 37 is threadably attached to plunger 34, and a spring 39 biases plunger 34 to the left in FIG. 4. Plunger 34 can be withdrawn from any bore 33 in which it is located and this will permit upper plate 21 to be pivoted relative to lower plate 14. When the desired position of upper plate 21 is reached, the handle 37 of detent 35 is released and spring 39 will bias plunger 34 into the bore 33 at which it is located. This structure thus permits the azimuth of the upper plate 21 to be selected so that the fishing rod holding tube 12 will point in the desired direction.

Figure 7:
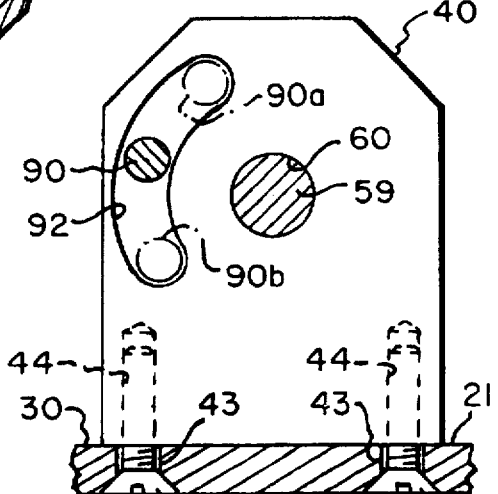
FIG. 7 is a cross sectional view taken substantially along line 7—7 of FIG. 4 and showing the structure which limits movement of the holding tube between its horizontal and vertical positions.
Figure 10:
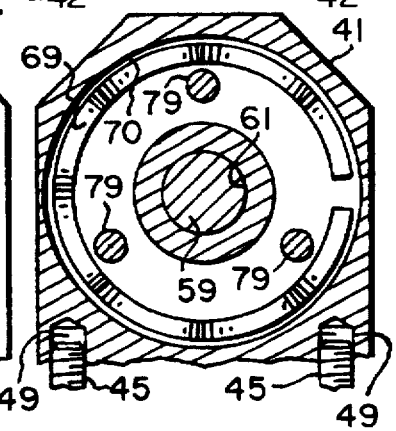
FIG. 10 is a fragmentary cross sectional view taken substantially along line 10—10 of FIG. 4 and showing the relationship between the spring and the right side upright member.
Figure 11:
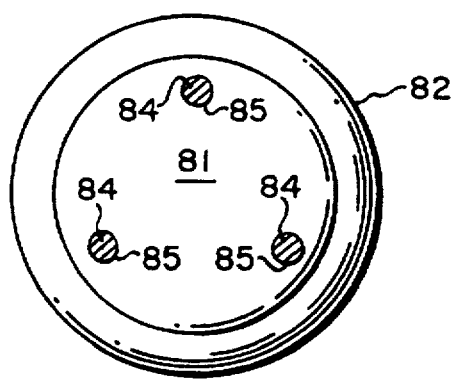
FIG. 11 is a cross sectional view taken substantially along line 11—11 of FIG. 4.
Figure 12:
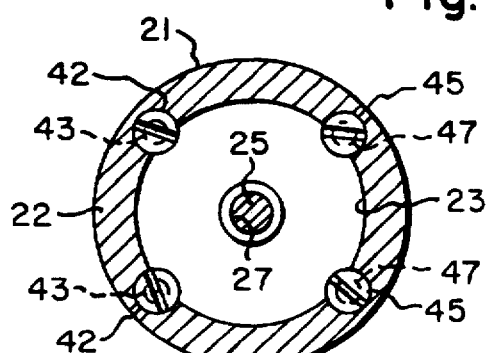
FIG. 12 is a cross sectional view taken substantially along line 12—12 of FIG. 3.

The base 11 includes a left upright member 40 and a right upright member 41. Upright member 40 is secured to base plate 14 by bolts 42 (FIGS. 3 and 12) which extend through apertures 43 in top plate 21 and are received in spaced threaded bores 44 (FIG. 7) in upright member 40. Upright member 41 is secured to upper base plate 21 by bolts 45 which extend through bores 47 (FIG. 12) in top plate 21 and are received in threaded bores 49 (FIG. 10) in upright member 41.

The lower end of fishing rod holding tube 12 is secured to pivotal member 50 (FIG. 6) by means of a threaded end 51 which is threadably received in threaded bore 52 of pivotable member 50. The threaded end 51 is part of member 53 which is press-fitted into the barrel 54 of holding tube 12. A plurality of circumferentially spaced bores 55 are located in member 53 to permit water to drain from barrel 54. A collar 57 is interposed between member 53 and pivotable member 50.

Pivotable member 50 is pivotally mounted on shaft 59 (FIG. 4) having ends which are received in bores 60 and 61 in upright members 40 and 41, respectively. A washer 62 is interposed between pivotal member 50 and upright member 40 and a friction ring 63 is interposed between pivotal member 50 and upright member 41.

A one-way movable connection 64 is interposed between pivotable member 50 and upright member 41 to provide a ratcheting action which permits holding tube 12 to be pivoted in a counterclockwise direction in FIG. 1 toward vertical position 12b by merely applying a manual force to the holding tube. This is desired to rapidly set a hook when there is a strike. However, the one-way movable connection 64 will not permit holding tube 12 to be manually pivoted in a clockwise direction in FIG. 1 toward position 12a unless one-way movable connection 64 is disengaged. As noted above, if it is desired to move holding tube 12 from an existing position to a more vertical position, it is merely necessary to manually swing it in a counterclockwise direction in FIG. 1. However, if it is desired to move it to a more horizontal position from its existing position, it is necessary to disengage the one-way movable connection 64.

The one-way movable connection 64 comprises two serrated discs 65 and 67 which are normally biased into engagement with each other by annular spring 69 (FIG. 10) which is retained in annular groove 70 of upright member 41. Ratcheting discs 65 and 67 are identical if they are oriented in a like attitude. However, when the teeth having asymmetrical serrated edges 65' and 65" and the teeth having asymmetrical serrated edges 67' and 67" of discs 65 and 67, respectively, face each other and are biased into engagement, they orient as shown in FIG. 5. Thus, disc 65, which is secured to pivotable member 50, can move in the direction of arrow 71 relative to disc 67, which is secured to upright member 41, but disc 65 will be prevented from moving relative to disc 67 in the direction of arrow 72. In the foregoing respect, when the holding tube 12 is moved to a more vertical position, serrated disc 65 will move in the direction of arrow 71 and serrated disc 67 will move to the right against the bias of spring 69 in upright member 41. More specifically, it can be seen from FIG. 5 that when serrated ratcheting disc 65 is moved in the direction of arrow 71, the surfaces 65' of disc 65 will slide relative to surfaces 67' of disc 67 with a ratcheting motion because of L heir inclination. however, if an attempt is made to move serrated disc 65 in the direction of arrow 72 relative to stationary disc 67, the abutting surfaces 65" and 67" of serrated discs 65 and 67, respectively, will prevent movement of disc 65 in the direction of arrow 72.

Figure 8:
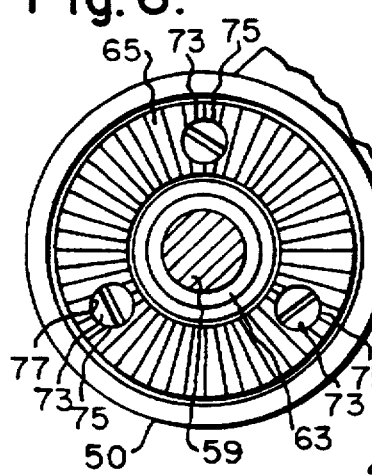
FIG. 8 is a fragmentary cross sectional view taken substantially along line 8—8 of FIG. 4 and showing the connection between the left side ratcheting disc and the pivotable member.
Figure 9:
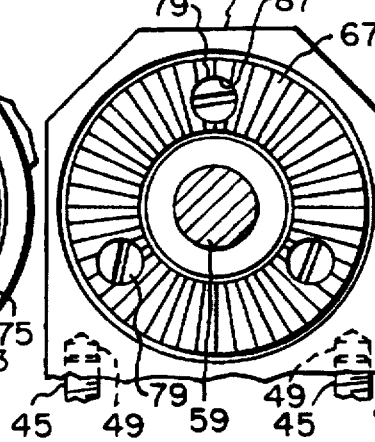
FIG. 9 is a fragmentary cross sectional view taken substantially along line 9—9 of FIG. 4 and showing the position of the right side ratcheting disc in the right side upright member and its connection to the releasing handle.

Serrated disc 65 is fixedly secured to the end of pivotal member 50 by means of bolts 73 (FIGS. 3, 4 and 8) which are received in tapped bores 74 of pivotal member 50. The heads 75 of bolts 73 are received in countersunk depressions 77 of serrated disc 65. Serrated disc 67 is secured within an annular groove 70 of upright member 41 by means of shoulder bolts 79. In this respect, the shoulders 80 of bolts 79 bear against the face 81 of disengagement knob or member 82 after these shoulders slidably pass through bores 83 of upright member 41 and the shanks 84 of shoulder bolts 79 are threadably received in bores 85 of disengagement member 82. The heads of shoulder bolts 79 are received in counterbores 87 in disc 67. It can thus be seen that because of the foregoing attachment between serrated disc 67 and disengagement member or knob 82 with annular spring 69 therebetween, serrated disc 67 will be biased into engagement with serrated disc 65 and the face 81 of disengagement member 82 will bear against the outer surface 89 of upright member 41.

It can thus be readily seen that when it is desired to pivot holding tube 12 toward its horizontal position 12a, it is merely necessary to pull disengagement member 82 to the right in FIG. 2 to thereby pull serrated disc 67 attached thereto against the bias of spring 69 to thereby disengage it from serrated disc 65. Once these serrated discs have been disengaged, there is no resistance to manually moving holding tube 12 downwardly toward position 12a in FIG. 1. After disengagement member 82 is released, spring 69 will bias serrated disc 67 into engagement with serrated disc 55 and also force disengagement member 82 against upright member 41. However, as noted above, if it is desired to move holding tube 12 to a more vertical position toward position 12b, it is merely required to grasp holding tube 12 and merely swing it toward position 12b. This is done when there is a strike and it is desired to jerk the line to set the hook.

As briefly noted above, the limits of movement of holding tube 12 are positions 12a and 12b. The structure which produces these limits is a rod 90 (FIGS. 3 and 7) having one end which is received in a bore 91 in pivotal member 50 and the other end which is received in arcuate slot 92 (FIG. 7) in upright member 40. Thus, when rod 90 is moved to position 90a, this will correspond to the horizontal position 12a of the holding tube 12 and when it is moved to position 90b, this will correspond to the vertical position 12b of the holding tube 12. The lower plate 14 of base 11, as shown in the preceding figures, has an outer edge which is flush with the outer edge of upper plate 21 of base 11. Thus, the screws 17 which attach the lower plate 14 to external member 15 are concealed An alternate plate 93 is shown in FIG. 14. This plate has a flange 94 which receives screws 17. However, it has a central boss 20' which is analogous to central boss 20 of FIG. 4 on which upper plate 21 is mounted in the same manner as described above relative to FIG. 4 by means of a bolt 24 having a threaded shank 25.

It can thus be seen that the improved fishing rod holder of the present invention is manifestly capable of achieving the above objects. More specifically, because the fishing rod holding tube 12 can be swung effortlessly from any position to its vertical position 12b, there can be practically no time elapsed between the strike of the fish and the setting of the hook which is achieved by merely manually pivoting the holding tube 12 toward the upright position 12b. Furthermore, when it is desired to remove the fishing rod 13 from the tube 12, it is merely necessary to manually pivot the rod to its vertical position 12b, if this has not already been done, to thereby permit the rod 13 to be lifted vertically upwardly. This obviates the necessity to lean outwardly over the rail of the boat to remove the fishing rod 13 if the holding tube 12 remained in its outwardly extended position, such as shown at 12 in FIG. 1. In addition to the foregoing, the holding tube 12 can be set at any desired angle from between its horizontal position 12a and its vertical position 12b. As noted above, to move holding tube 12 to a more vertical position, it is merely necessary to swing it manually in a counterclockwise direction in FIG. 1. However, if it is desired to move it to a more horizontal position, it is merely necessary to disengage the one-way movable connection 64 in the above-described manner so that tube 12 can be manually pivoted downwardly. The fact that the ratcheting serrated discs can have the serrations at small angles, there are practically infinite positions which can be obtained for holding tube 12. In this respect, if the pitch of the teeth is as low as 3.6°, there are approximately 25 positions between the horizontal position of the holding tube at 12a and the vertical position at 12b. Furthermore, as noted above, the azimuth of the holding tube 12 can be set at any desired angle because of the detent connection between the upper plate 21 and the lower plate 14 of the base 11.

While preferred embodiments of the present invention have been disclosed, it will be appreciated that it is not limited thereto but may be otherwise embodied within the scope of the following claims.

What is claimed is:

1. A fishing rod holder comprising a base including a pair of spaced upright members, a fishing rod holding tube, a pivotable member connected to said fishing rod holding tube and pivotally positioned between said spaced upright members, a one-way movable connection interposed between one of said upright members and said pivotable member for permitting said fishing rod holding tube to be manually moved to a more vertical position while positively preventing said fishing rod holding tube from being manually moved to a more horizontal position, said one-way movable connection comprising a first serrated disc with first asymmetrical teeth affixed to said pivotable member, a second serrated disc with second asymmetrical teeth mounted on said one of said upright members, a spring in said one upright member biasing said second serrated disc into engagement with said first serrated disc, and a disengagement member connected to said second serrated disc for manually disengaging said second serrated disc from said first serrated disc to permit said fishing rod holding tube to be manually moved to a more horizontal position.

2. A fishing rod holder as set forth in claim 1 wherein said base includes a bottom plate for attachment to an external surface, and a top plate to which said upright members are affixed.

3. A fishing rod holder as set forth in claim 2 including a pivotable connection between said top and bottom plates.

4. A fishing rod holder as set forth in claim 3 including a selectively actuatable detent between said top and bottom plates.

5. A fishing rod holder as set forth in claim 4 including a limiting connection between said base and said fishing rod holding tube for limiting the range of movement of said fishing rod holding tube.

6. A fishing rod holder as set forth in claim 1 including a limiting connection between said base and said fishing rod holding tube for limiting the range of movement of said fishing rod holding tube.

7. A fishing rod holder as set forth in claim 6 wherein said limiting connection comprises an arcuate slot of predetermined length in one of said upright members, and a pin having the other end in said pivotable member and its opposite end in said arcuate slot.

8. A fishing rod holder as set forth in claim 7 wherein said base includes a bottom plate for attachment to an external surface, and a top plate to which said upright members are affixed.

9. A fishing rod holder as set forth in claim 8 including a pivotable connection between said top and bottom plates.

10. A fishing rod holder as set forth in claim 9 including a selectively actuatable detent between said top and bottom plates.

* * * * *

UNITED STATES PATENT AND TRADEMARK OFFICE
CERTIFICATE OF CORRECTION

PATENT NO. : 5,761,844
DATED      : June 9, 1998
INVENTOR(S): Louis A. Horschel

It is certified that error appears in the above-identified patent and that said Letters Patent is hereby corrected as shown below:

Column 4, line 16, change "L heir" to --their--;

line 50, change "55" to --65--.

Column 6, line 38 (claim 7), change "one" to --the other--;

line 39 (claim 7), change "the other" to --one--.

Column 4, line 17, change "however" to --However--.

Signed and Sealed this

Eighteenth Day of August, 1998

Attest:

BRUCE LEHMAN

*Attesting Officer*       *Commissioner of Patents and Trademarks*